United States Patent
Leleve et al.

(10) Patent No.: US 7,423,752 B2
(45) Date of Patent: Sep. 9, 2008

(54) METHOD FOR DETECTING NOCTURNAL FOG AND SYSTEM FOR IMPLEMENTING THE METHOD

(75) Inventors: Joël Leleve, Epinay sur Seine (FR); Abdelaziz Bensrhair, Mont Saint Aignan Cedex (FR); Julien Rebut, Paris (FR)

(73) Assignee: Valeo Vision, Bobigny (FR)

( * ) Notice: Subject to any disclaimer, the term of this patent is extended or adjusted under 35 U.S.C. 154(b) by 111 days.

(21) Appl. No.: 11/405,884

(22) Filed: Apr. 18, 2006

(65) Prior Publication Data

US 2007/0031006 A1    Feb. 8, 2007

(30) Foreign Application Priority Data

Apr. 19, 2005   (FR)   ................... 05 03906

(51) Int. Cl.
*G01N 21/00*   (2006.01)
(52) U.S. Cl. .................... 356/338; 250/559.4
(58) Field of Classification Search ............. 250/559.4, 250/208.1, 227.25, 573–574; 359/229, 603–605; 356/337–338, 341–342
See application file for complete search history.

(56) References Cited

U.S. PATENT DOCUMENTS 7,170,657 B2 * 1/2007 Higuchi ...................... 358/488

2005/0040333 A1 * 2/2005 Fluery et al. ................. 250/332

FOREIGN PATENT DOCUMENTS

| EP | 1 498 721 | 1/2005 |
|----|-----------|--------|
| FR | 0 687 594 | 12/1995 |
| FR | 2 847 367 | 5/2004 |

OTHER PUBLICATIONS

Bursch et al, Wavelet Transform for Analyzing Fog Visibility, IEEE Intelligent Systems, Nov./Dec. 1998, pp. 66-71.
Leleve et al, Fog Lamp Automation with Visibility Sensor, VDI Berichte Nr. 1907, 2005, pp. 151-160.
Hautiere et al., Drive Assistance Fog Detection and Measure of the Visibility Distance, undated.

* cited by examiner

*Primary Examiner*—Gregory J. Toatley, Jr.
*Assistant Examiner*—Tri T Ton
(74) *Attorney, Agent, or Firm*—Jacox, Meckstroth & Jenkins

(57) ABSTRACT

The invention concerns a system and method for detecting, at night, the presence of an element such as fog interfering with the visibility of a road scene situated in front of a vehicle, comprising the following operations: acquiring an image of the road scene, extracting, from the image of the road scene, at least one light halo produced by a lighting device of the vehicle, approximating a form of this light halo by an elliptic curve, comparing the form of this light halo with the elliptic curve obtained in order to deduce therefrom the presence or absence of an element interfering with visibility.

24 Claims, 4 Drawing Sheets

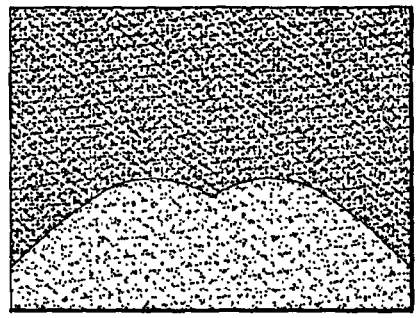
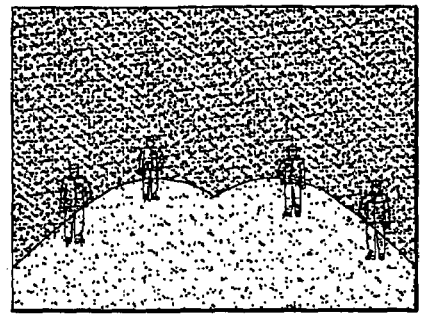
Fig. 2A  Fig. 2B
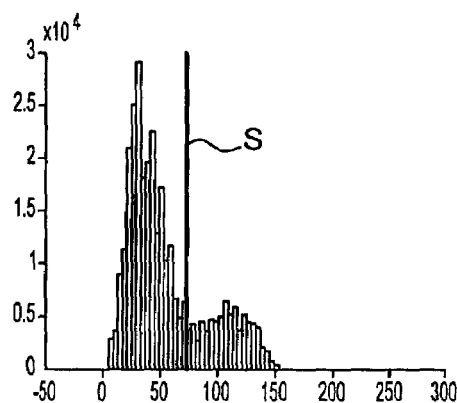
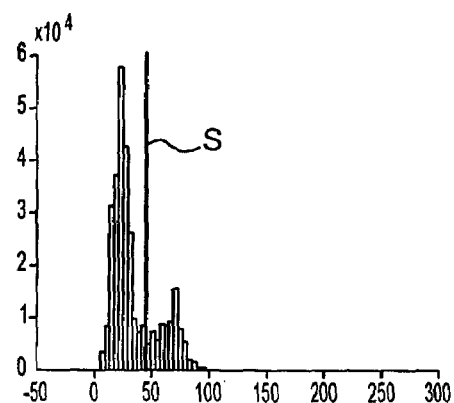
Fig. 3A  Fig. 3B
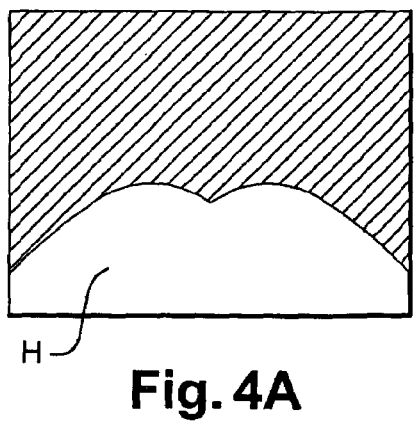
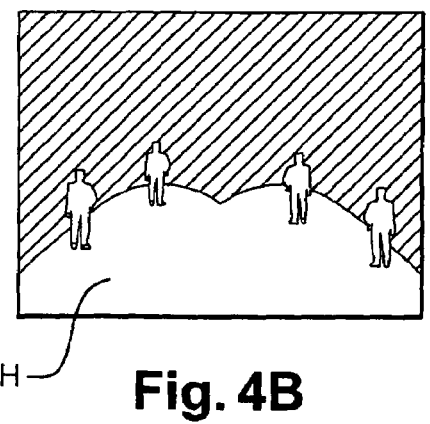
Fig. 4A  Fig. 4B

METHOD FOR DETECTING NOCTURNAL FOG AND SYSTEM FOR IMPLEMENTING THE METHOD

FIELD OF THE INVENTION

The invention concerns a method for detecting, at night, the presence of an element such as fog interfering with the visibility of a driver of a road vehicle and for determining, when such an element is detected, the visibility distance for the driver. The invention also concerns a system for implementing this method. It also concerns a vehicle comprising such a system.

The invention finds applications in the automotive field and, in particular, in the field of lighting and signalling for road vehicles.

BACKGROUND OF THE INVENTION

One of the problems encountered, in the field of signalling and lighting a road by a vehicle, concerns the visibility of the road in fog. It is known in fact that in foggy weather the visibility of the road scene situated at the front of the vehicle is reduced, which can cause accidents. In order to improve the visibility of the road scene, in foggy weather, current vehicles are equipped with fog light devices at the front of the vehicle and fog lights at the rear of the vehicle.

Switching lighting devices and fog lights on and off is generally controlled manually by the driver from switches disposed on the vehicle dashboard. However, it may happen that the driver forgets to switch on his lights and fog lights. Failure to switch on the fog lights may prove to be dangerous for the vehicle situated behind the vehicle in question. The lack of switching on of the fog lighting devices causes poor visibility of the road scene situated in front of the vehicle with all the risks that this entails.

Conversely, the improper use of fog lights, for example in rain, may cause a nuisance to the driver situated behind the vehicle in question. Likewise the improper use of fog lights at the front of the vehicle may be a nuisance for the drivers coming in the opposite direction in the absence of fog. On the other hand, in the case of intense fog, it may be advantageous for the driver of the vehicle to be able to have available sufficiently powerful lighting to afford correct visibility of the road scene.

There currently exist devices for detecting the presence of fog for automatically controlling the switching on of the lights and illumination devices and enabling the driver to adapt the speed of his vehicle according to the visibility that he has of the road scene situated in front of the vehicle. One of these devices for detecting the presence of fog uses an anti-collision system of the LIDAR (Light Detection and Ranging) type, which makes it possible to evaluate the transmission of the atmosphere in order to deduce therefrom the presence of fog. However, LIDARs are very expensive systems; installing them is therefore difficult to envisage on conventional vehicles.

There exists, moreover, a method for detecting the presence of fog and measuring the visibility distance in daytime conditions. This method is described in the article entitled "Driving assistance: automatic fog detection and measure of the visibility distance" by N Hautiere and D. Aubert. It is based on Koschmieder's law, which provides a simple expression of the luminance of an object observed at a distance d:

$$L = L_0 \exp(-kd) + L_f(1 - \exp(-kd))$$

where $L_0$ is the intrinsic luminance of the object, k is the coefficient of extinction of the fog and $L_f$ is the luminance of the ambient fog caused by the many diffusions of the light in the atmosphere. The parameters of the Koschmieder model must be calculated on homogeneous sky/road regions. However, this method is difficult to use for the detection of nocturnal fog, since the parameters used for extracting the homogeneous regions by day are much less marked at night. Locating these regions is therefore difficult. In addition, in night-time conditions, the illumination of the road scene is achieved by the vehicle headlights and not by light coming from the sky. There then appears a light halo around the headlights, which makes it difficult to us Koschmieder's law.

There also exist a method and system described in patent application FR-A-2 847 367. This method is based on the search for a homogeneous region in an image of the road scene and on the search for a vertical light gradient. This search makes it possible to establish a curve, at the reversal point of which a relationship is obtained between the visibility distance and the reversal point. More precisely, this method comprises a step of separating the image into two parts by a vertical line passing substantially through the middle of the image, a step of determining the luminosity of the pixels of the vertical line according to the position of the pixels on the vertical line, a step of calculating the reversal point of the curve representing the luminosity of the pixels according to their position; and a step of determining the visibility distance of the driver from the visibility distance of the driver from the position of this reversal point on the image.

In this method, it is considered that the light comes from the sky and that the dark area is situated close to the ground. The separation between the dark area and the light area is then made by a line. This method is therefore adapted solely for the detection of daytime fog and not for the detection of night-time fog. This is because, in nocturnal conditions, the light does not come from the sky; it comes from the vehicle headlights. However, the light emitted by the headlights forms, in the presence of fog, light halos in a non-planar form. The light emitted by the headlights of a vehicle cannot therefore be separated by a horizontal straight line.

In addition, at night, it is important to take into account the fact that more and more lighting devices comprise a DBL (Dynamic Bending Light) system which provides pivoting of the headlight according to the path of the road. For example, with a DBL system, the headlights pivot to the right of the axis of the vehicle when there is a bend to the right and to the left when there is a bend to the left. The area illuminated by the vehicle headlights is therefore not constant, that is to say not necessarily in the axis of the vehicle.

SUMMARY OF THE INVENTION

The aim of the invention is precisely to remedy the drawbacks of the techniques described above by proposing a method for detecting the presence of nocturnal fog. In nocturnal conditions, the characteristics of the image of the road scene, in particular the contrast, the detail of the contours and the filtering of the high frequencies are less important than in daytime conditions. The treatment of images for detection of nocturnal fog can therefore not be carried out with the known image processing techniques for the detection of daytime fog. To resolve this problem, the invention proposes to take into account a major effect of nocturnal fog, considered to be a nuisance in the previous techniques, namely the halo effect. This is because, in foggy weather, a halo of light appears around the vehicle headlight. This halo is due to the diffusion of the light in the particles of water forming the fog. The method of the invention proposes precisely to detect these light halos on images of the road scene and then process them in order to determine, from the parameters of these halos, the presence of fog. When fog has been detected, the method of the invention proposes to determine the visibility distance for the vehicle.

More precisely, the invention concerns a method for detecting, by night, the presence of an element such as fog interfering with the visibility of a road scene situated at the front of a vehicle, in which the following operations are performed: acquiring an image of the road scene, extracting, from the image of the road scene, at least one light halo produced by a lighting device of the vehicle, approximating a form of this light halo by an elliptic curve, and comparing the form of this light halo with the elliptic curve obtained in order to deduce therefrom the presence or absence of an element interfering with visibility.

The method of the invention can comprise one or more of the following characteristics: when an element interfering with visibility is present, it comprises an operation of determining the visibility distance according to the parameters of the said elliptic curve; the operation of extracting the light halo comprises a binarisation of the image and an extraction of the contour of the halo from the binarised image; the operation of extracting the light halo comprises the detection of an optimum binarisation threshold; the operation of approximation of the light halo comprises a determination of the parameters of the elliptic curve; the determination of the parameters comprises an estimation of the centre of gravity of the elliptic curve; the centre of gravity of the elliptic curve is determined by detecting the points on the elliptic curve having the same gradient; the centre of gravity of the elliptic curve is determined by construction, from tangents to the said curve; the comparison of the form of the light halo with the elliptic curve comprises a calculation of the approximation error between the elliptic curve and the contour of the halo of the binarised image; the determination of the visibility distance comprises a determination of a vertical profile passing through the centre of gravity of the elliptic curve and a reversal point of the said elliptic curve; and the elliptic curve is obtained by combining two ellipses.

The invention also concerns a system for implementing this method. In accordance with the invention, this system for detecting, by night, the presence of an element such as fog interfering with the visibility of a road scene situated in front of a vehicle comprises a camera for acquiring images of the road scene and image processing means for extracting at least one light halo from the image of the road scene, producing an approximation of the form of this light halo by an elliptic curve and comparing the form of this light halo with the elliptic curve in order to deduce therefrom the presence or absence of an element interfering with visibility.

This system comprises one or more of the following characteristics: it comprises means for determining the visibility distance of the vehicle, when an element interfering with visibility has been detected; it comprises means for detecting a transition between day and night; it is connected to a device controlling an alarm intended to indicate a speed of the vehicle unsuited to the visibility distance; it is connected to a device controlling at least one light source of the vehicle in order to adapt the light intensity of the said light source to the visibility distance; and it is connected to a device controlling the speed of the vehicle in order to modify the said speed according to the visibility distance.

Other objects and advantages of the invention will be apparent from the following description, the accompanying drawings and the appended claims.

The invention also concerns a road vehicle comprising a nocturnal fog detection system as previously described.

BRIEF DESCRIPTION OF THE FIGURES

FIGS. 2A and 2B depict examples of images of nocturnal road scenes, respectively in the presence and absence of fog.

FIGS. 3A and 3B show histograms of grey levels obtained during the method of the invention for images 2A and 2B.

FIGS. 4A and 4B depict examples of binarised images obtained during the method of the invention for images 2A and 2B.

DETAILED DESCRIPTION OF SEVERAL ILLUSTRATIVE EMBODIMENTS OF THE INVENTION

The invention concerns a method for detecting the presence of an element such as fog interfering with the visibility of the driver of the vehicle. Subsequently, in describing the invention, it will be considered that the interfering element is actually fog, the latter being the most frequent element and the most interfering from the point of view of the visibility of vehicle drivers.

It should be noted however that the method according to the invention is able to detect other interfering elements such as smoke, rain or snow, with certain adaptations made to the embodiments described below. These adaptations are within the capabilities of a person skilled in the art instructed by the present disclosure and should be considered to be included in the present invention.

When fog has been detected, the method of the invention makes it possible to determine the visibility distance of the vehicle, that is to say the distance up to which the driver of the vehicle can perceive any obstacles in the road scene.

In order to detect the presence of fog, the method of the invention takes into account the light halo effect produced by the vehicle lighting device, in the case of nocturnal fog. For this, the method of the invention proposes to produce images of the road scene situated in front of the vehicle and to detect, on these images, the light halo or halos. As explained in more detail below, the vehicle headlights may produce a single light halo. According to the type of headlight, they may also produce two light halos which intersect, forming a single light zone whose contour differs substantially from that of a single halo. The major part of the description will be drawn up in the case where the headlights produce a single light halo, it being understood that the case of two halos will be described in detail when the method of the invention diverges for one or two halos.

Figure 1:
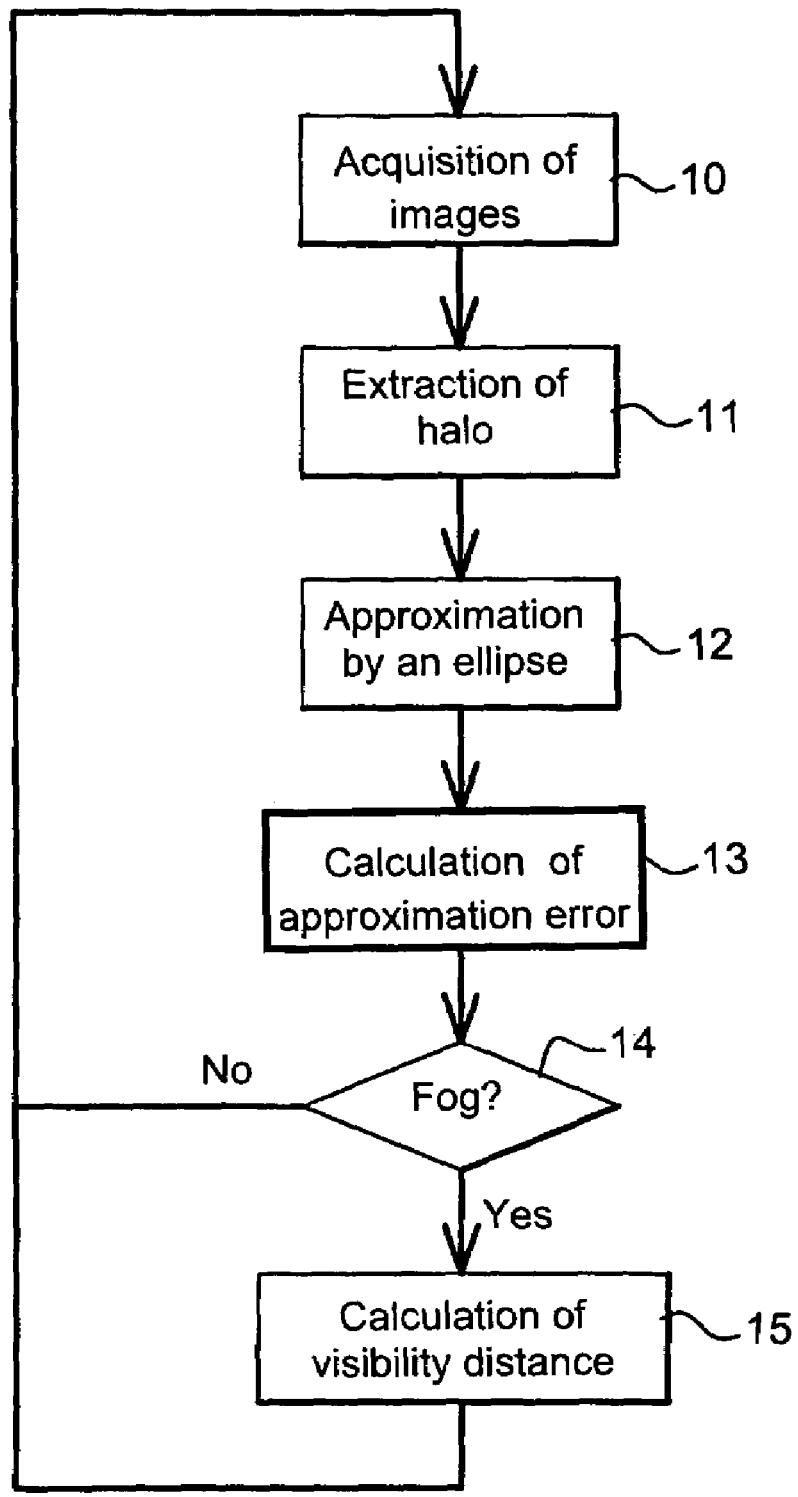
FIG. 1 depicts schematically the functional diagram of the method of the invention.

The various steps of the method of the invention are represented by a functional diagram in FIG. 1. This method consists first of all of acquiring successively several images of the road scene (step 10). These images are processed successively according to the same method. The successive processing of several images makes it possible to detect the appearance or disappearance of fog. Each image is processed in the way which will now be described.

The light halo coming from the headlights is extracted from the image (step 11). The image of the road scene, at night, contains very little information. Thus, in order to detect the halo in the image, that is to say the lightest area of the image, a binarisation of this image is carried out. This binarisation consists of separating, according to a binary threshold, the dark pixels and the light pixels in the image. This binarisation can be carried out using the method described by N. Otsu in the article "A Threshold Selection Method from Gray-Level Histograms", IEEE Transactions on Systems, Man and Cybernetics, Vol 9, No 1, pp 62-66, 1979.

The Otsu method proposes to find an optimum binarisation threshold, defined as being that for which the intra-class variance is at minimum. Two examples of extraction of light halos are shown, respectively, in FIGS. 2A, 3A, 4A and 2B, 3B, 4B.

More precisely, the images in FIGS. 2A and 2B show two examples of images of the same road scene produced at night, respectively in the presence of fog and in the absence of fog. In the presence of fog (FIG. 2A), there can be seen in the image only a dark area in the upper part of the image and a light area in the lower part of the image. This light area corresponds to the light halo produced by the vehicle headlights. In the absence of fog (FIG. 2B), there can be seen in the image a dark area in the upper part of the image, a lighter area in the lower part of the image and obstacles, for example persons, in the intermediate area of the image.

FIGS. 3A and 3B depict the histograms of the grey levels of the pixels of the respective images 2A and 2B with, in a thick line, the optimum binarisation threshold S determined for each image, by the Otsu method. This optimum threshold S is chosen as being the limit between high grey levels and low grey levels. Each image is then thresholded with respect to this optimum threshold S. The method then makes it possible to obtain binarised images as shown in FIGS. 4A and 4B. The images obtained are digital images with two levels of pixels: level 1 for the pixels corresponding to the dark area of the initial image and level 0 for the pixels corresponding to the light area of the initial image. As can be seen in FIG. 4A, in the presence of fog, the binarised image comprises a limit between the white area (pixels at level 0) and the black area (pixels at level 1) that is relatively sharp with an elliptical shape. On the other hand, in the absence of fog, the binarised image 4B comprises a limit between the white area (pixels at level 0) and the black area (pixels at level 1) that is relatively fuzzy with white parts inserted in the black area and corresponding to visible obstacles in the road scene.

In other words, the binarised, or thresholded, images 4A and 4B show the light halo H extracted from the initial images, respectively 2A and 2B. When this halo H has been extracted, the method of the invention consists of making an approximation of the form of this halo. More precisely, the form of this halo H is approximated by an elliptic curve. Elliptic curve means the curve corresponding to the form of an ellipse or the curve obtained by combining two ellipses. This is because certain types of headlight, for example DBL headlights, produce a light halo whose contour has the form of two overlapping ellipses. In particular, when the headlights are directed straight in front of the vehicle, the contour of the light halo has the form of an ellipse. When the headlights illuminate laterally towards the right or towards the left of vehicle, with the DBL function, the contour of the light halo has the form of two interleaved ellipses. In the above case, the method of the invention therefore approximates the light halo by two interleaved ellipses.

According to the method of the invention, the approximation of the light halo (step 12 of the FIG. 1) is made by determining the best elliptic curve, within the meaning of the least squares theory. For this purpose contour of the light halo is approximated by the mathematical formula:

$$\left[\frac{((x-xc)\cos(\Phi)-(y-yc)\sin(\Phi))}{a}\right]^2 + \left[\frac{((x-xc)\sin(\Phi)-(y-yc)\cos(\Phi))}{b}\right]^2 = 1$$

where xc is the position of the center of gravity of the ellipse of the x axis, yc is the position of the center of gravity of the ellipse on the y axis, a is the major axis of the ellipse, b is the minor axis of the ellipse and $\phi$ is the angle of rotation of the ellipse.

This general equation of an ellipse comprises five parameters. An estimation of the five parameters makes it possible to approximate the form of the contour of the light halo. As will easily be understood, the estimation of these parameters requires a certain amount of calculation time. Thus, in order to improve this calculation time, the method of the invention proposes not to calculate these five parameters simultaneously. For this purpose, the method of the invention proposes to break down the estimation of these parameters into two parts, namely an estimation of the centre of the ellipse (position on the x axis and position on the y axis) and then an estimation of the other parameters, such as the major axis, the minor axis and the angle of the ellipse.

The estimate of the center of the ellipse can be carried out using the symmetry properties of the ellipse, which are that each point on an ellipse has an opposite point which must have the same contour gradient, that is to say the same derived function at this point. All the pairs of points having an identical gradient are then sought and the mid-point of these pairs is calculated. A two-dimensional histogram is constructed, which comprises these mid-points as well as the maxima selected as candidates for the center of gravity of the ellipse.

Figure 6:
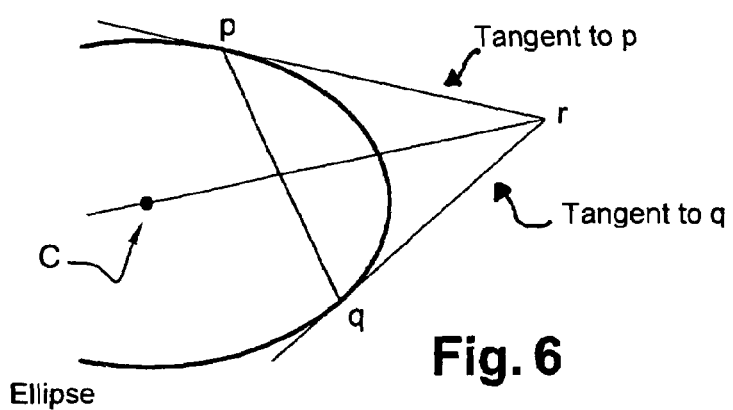
FIG. 6 depicts a method of determining the center of an ellipse, according to the method of the invention.

Another method of estimating the center of gravity of the ellipse can be used, in particular when part of the ellipse is concealed in the image. This other method consists of constructing the center of the ellipse from tangents at different points on the ellipse. One example of construction according to this method is shown in FIG. 6. This method consists of choosing several points on the ellipse, for example the points p and q, and then constructing the tangent to each of these points. These tangents join at a point r. The center of the ellipse is situated on the straight line cr, passing through the center of the segment pq and the intersection of the tangents at p and q. By performing this operation several times, that is to say for different pairs of points p and q on the ellipse, the straight lines cr obtained intersect at the centre c of the ellipse. The extraction of the coordinates of the centre c can then be carried out by various means such as for example by a method of accumulators, the maximum of which will be adopted for designating the center.

When the position of the center c of the ellipse is known, the ellipse is placed in a reference frame related to this center. In this reference frame, the equation of the ellipse is written $ax^2+2bxy+cy^2=1$ and can be resolved by the least squares method. The system can then be expressed in the matrix form $$\begin{bmatrix} x_1^2 & 2x_1y_1 & y_1^2 \\ x_2^2 & 2x_2y_2 & y_2^2 \\ x_n^2 & 2x_ny_n & y_n^2 \end{bmatrix} \begin{bmatrix} a \\ b \\ c \end{bmatrix} = \begin{bmatrix} 1 \\ 1 \\ 1 \end{bmatrix}$$

where the parameters a, b and c can be obtained by inversion of the system.

Figure 5A:
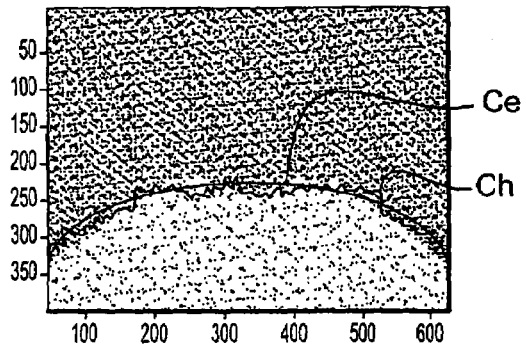
FIGS. 5A, 5B and 5C depict various examples of light halos approximated by elliptic curves according to the method of the invention.
Figure 5B:
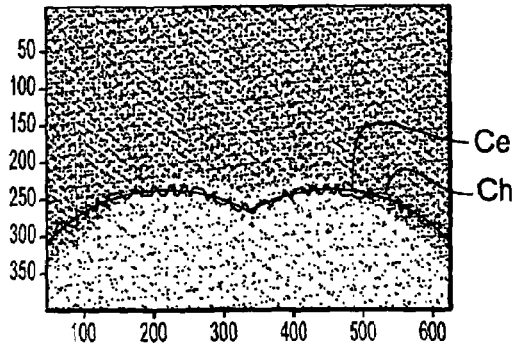
Figure 5C:
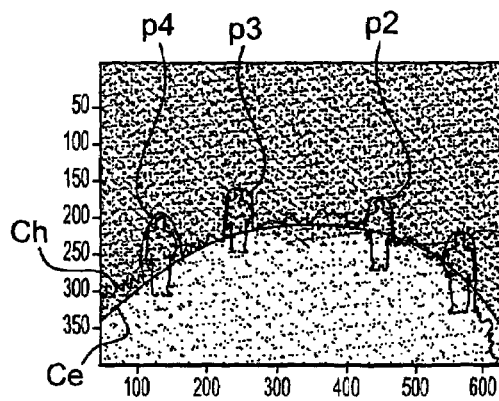

Then all the parameters of the elliptic curve approximating the light halo are known. FIGS. 5A, 5B and 5C depict three examples of images of road scenes each showing the contour of the halo Ch and the elliptic curve Ce approximating this contour. In particular, FIG. 5A shows the elliptic curve Ce and the contour of the halo Ch in the presence of fog in the case of conventional headlights producing a halo in the form a single ellipse. FIG. 5B shows the elliptic curve Ce and the contour of the halo Ch in the presence of fog in the case of DBL headlights producing a halo in the form of a double ellipse. In these two cases, it can be seen that the elliptic curve is relatively close to the contour of the halo, which means that the halo is indeed approximated by the elliptic curve. It is deduced from this that fog is present. On the other hand, in FIG. 5C, the elliptic curve Ce is relatively far away from the contour of the halo Ch, in particular at the peaks of the halo P1 to P4. It is deduced from this that there is no fog interfering with visibility.

This is because, the denser the fog, the more quickly the light is reflected, which means that the contour of the halo approaches an ellipse. On the other hand, when visibility is good, the light halo has a more diffuse form, and therefore further away from an ellipse. Consequently, according to the form of the elliptic curve obtained, that is to say according to the calculated parameters of the ellipse, the presence or absence of fog can be deduced.

The deduction of the presence or absence of fog can therefore result in a comparison of the elliptic curve with the contour of the halo obtained by the binarisation of the image. This comparison can be obtained, as shown schematically in FIG. 1, by calculating an approximation error (step 13). This approximation error corresponds to the quadratic error calculated according to a known method, between the contour of the halo and the elliptic curve. As long as this error is relatively small, it is considered that fog is present. When the error is high, it is considered that visibility is good.

As shown in FIG. 1, when the approximation error has been determined, the presence or not of fog is deduced according to the value of this error (step 14). The information on the presence or absence of fog can then be given to the driver of the vehicle In one embodiment of the invention, the method can be continued by the determination of the visibility distance of the driver of the vehicle. More precisely, in the absence of fog, the method shown schematically in FIG. 1 continues with the acquisition of a new image processed as explained previously. When fog is present, the method continues with the determination of the visibility distance (step 15). This is because there exists a relationship between the parameters of the elliptic curve and the visibility distance. It is therefore possible to determine the visibility distance from the parameters of the elliptic curve determined as explained previously. This determination of the visibility distance is carried out by extracting a vertical profile passing through the center of gravity of the elliptic curve. The vertical profile is a section through the vertical image passing through the center of gravity of the elliptic curve. Each point on the vertical profile is characterized by a scanning line and a luminosi.

Figure 7A:
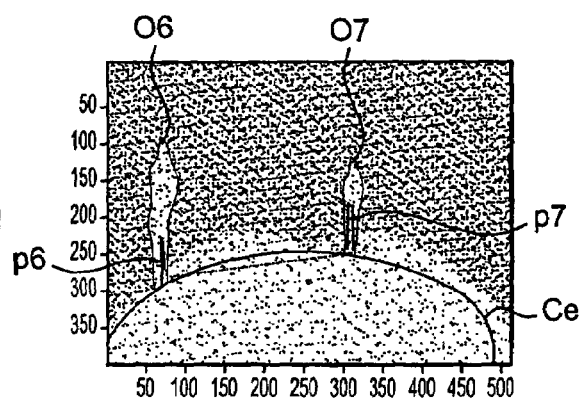
FIG. 7A depicts another example of an image of a nocturnal road scene in the presence of fog.
Figure 7B:
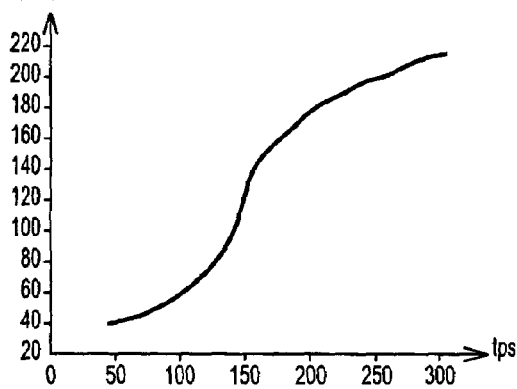
FIGS. 7B and 7C depict the vertical profile and the gradient obtained with the method of the invention for the image in FIG. 7A.

An example of a vertical profile is shown in FIG. 7B. This vertical profile was produced from the image of a road scene in FIG. 7A. This image in FIG. 7A shows a road scene with obstacles O6 and O7. The elliptic curve Ce approximating the contour of the light halo of this image 7A comprises light peaks P6 and P7 corresponding to the obstacles O6 and O7. The profile of this image is depicted in FIG. 7B as a function of time. When the vertical profile is smoothed, this means that the luminosity is diffuse and consequently that fog is present.

Figure 7C:
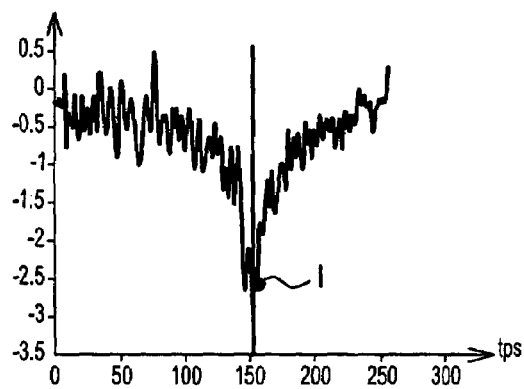

A derivative of this vertical profile can then be traced, as shown in FIG. 7C. This derivative corresponds to the gradient of the elliptic curve. A reversal point I can be read on this gradient. The position of this reversal point in the image supplies the visibility distance for the vehicle. The lower the reversal point in the image, the smaller the visibility distance, and vice versa.

Figure 8:
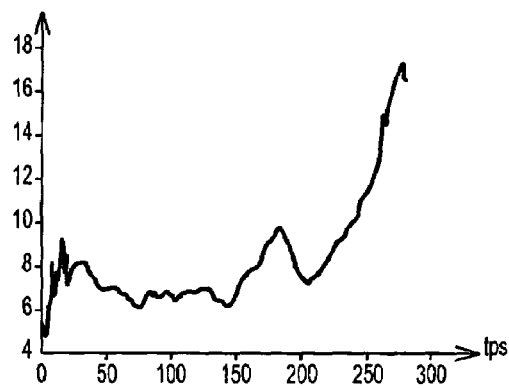
FIGS. 8, 9, 10 and 11 depict examples of curves obtained during the method of the invention and showing a change in visibility in the case of a dissipation of fog.
Figure 9:
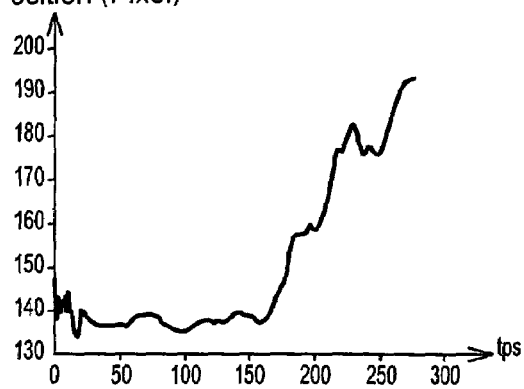
Figure 10:
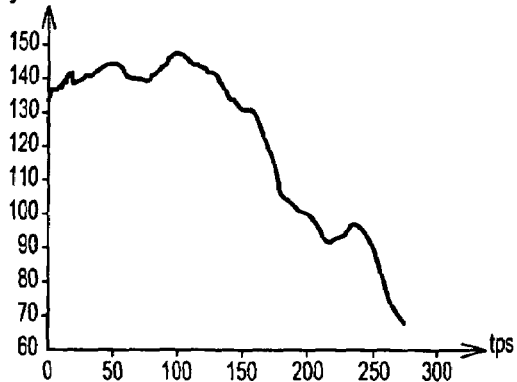
Figure 11:
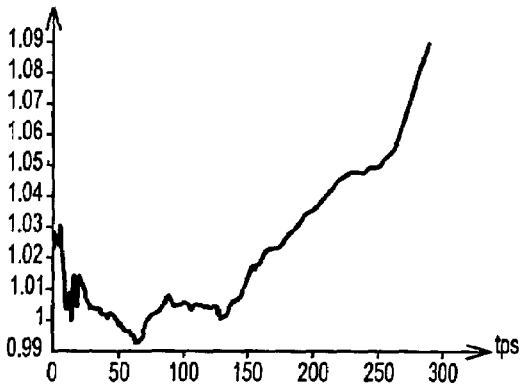

As will be understood from a reading of the above, several criteria can be taken into account, according to the method of the invention, for detecting the presence or not of fog and determining the visibility distance. This method therefore makes it possible to detect the appearance of nocturnal fog or, on the other hands the disappearance of nocturnal fog. An example of change in these various criteria, over time, is shown in FIGS. 8, 9, 10 and 11. More precisely, FIG. 8 shows the change in the approximation error in this case of dissipation of fog. FIG. 9 shows the change of the visibility distance in the case of dissipation of fog. FIG. 10 shows the change in the grey levels and FIG. 11 shows the change in the gradient in the case of dissipation of fog.

The method according to the invention can be implemented by a system for the nocturnal detection of the presence of fog. This system comprises a camera providing the taking of images of the road scene. This camera may be a camera already in place in the vehicle and used for functions other than the detection of fog, for example for the headlight DBL function.

This system also comprises image processing means for processing the images as described above. These image processing means can be a signal processing unit generally associated with a camera. The processing means can also be incorporated in a computer on the vehicle, for example a navigation computer.

This system makes it possible, by the determination of the vertical profiles, to determine whether light is coming from the sky or from the vehicle. Because of this it is possible to deduce therefrom the external luminosity condition, that is to say whether it is day or night. This system can therefore be associated with a system for detecting daytime fog and automatically detecting, at any time during the day, which system should be in operation (night-time detection system or daytime detection system).

Advantageously, the system of the invention can be connected to an alarm device for informing the driver that the speed of the vehicle is unsuited to the visibility distance. This system can also be connected directly to a device for automatic regulation of the speed.

This system can also be connected to a device for controlling the light sources of the vehicle so as to adapt the lighting power of the vehicle to the visibility distance. This control device can also control the switching on or switching off of the lighting or signalling devices specific to fog, such as fog lights.

The system of the invention can also be connected to a device for measuring the attitude of the vehicle or to any other navigation system, such as GPS (Global Positioning System) for taking account of this information before transmitting data to the driver or to the various control devices indicated previously.

What is claimed is:

1. A method for detecting, by night, the presence of an element such as fog interfering with the visibility of a road scene situated at the front of a vehicle, comprising the following operations:
   acquiring an image of the road scene,
   extracting, from the image of the road scene, at least one light halo produced by a lighting device of the vehicle,
   approximating a form of said at least one light halo by an elliptic curve, and
   comparing the form of said at least one light halo with the elliptic curve obtained in order to deduce therefrom the presence or absence of an element interfering with visibility.

2. The method according to claim 1, comprising, when the element interfering with visibility is present, an operation of determining the visibility distance according to parameters of the said elliptic curve.

3. The method according to claim 1, wherein the operation of extracting said at least one light halo comprises a binarisation of said image and an extraction of a contour of the halo on the binarised image.

4. The method according to claim 3, wherein the operation of extracting said at least one light halo comprises a detection of an optimum binarisation threshold.

5. The method according to claim 1, wherein the operation of approximating the said at least one light halo comprises a determination of the parameters of the elliptic curve.

6. The method according to claim 5, wherein the determination of the parameters comprises an estimation of a center of gravity of the elliptic curve.

7. The method according to claim 6, wherein said center of gravity of the elliptic curve is determined by detecting the points on the elliptic curve having the same gradient.

8. The method according to claim 6, wherein said center of gravity of the elliptic curve is determined by construction, from tangents to the said elliptic curve.

9. The method according to claim 3, wherein the comparison of the form of the said at least one light halo with the elliptic curve comprises a calculation of the approximation error between the elliptic curve and the contour of said at least one light halo of the binarised image.

10. The method according to claim 2, wherein the determination of the visibility distance comprises a determination of a vertical profile passing through the center of gravity of the elliptic curve and a reversal point on said elliptic curve.

11. The method according to claim 1, wherein said elliptic curve is obtained by the combination of two ellipses.

12. A system for detecting, at night, the presence of an element such as fog interfering with the visibility of a road scene situated in front of a vehicle, said system comprising:
   a camera for acquiring images of the road scene;
   image processing means for extracting at least one light halo from a captured image of the road scene for producing an approximation of a form of said at least one light halo by an elliptic curve and for comparing the form of said at least one light halo with said elliptic curve in order to deduce therefrom the presence or absence of the element interfering with visibility.

13. The system according to claim 12, comprising means for determining a visibility distance of the vehicle, when the element interfering with visibility has been detected.

14. The system according to claim 13, wherein it is connected to a device for controlling an alarm intended to indicate a speed of the vehicle unsuited to said visibility distance.

15. The system according to claim 13, wherein it is connected to a device controlling at least one light source of the vehicle in order to adapt the light intensity of the said at least one light source to said visibility distance.

16. The system according to claim 13, wherein it is connected to a device for controlling of a speed of the vehicle in order to modify the said speed according to the visibility distance.

17. The system according to claim 12, wherein said system further comprises means for detecting a transition between day and night.

18. Road vehicle, comprising a system for detecting, at night, the presence of an element such as fog interfering with the visibility of the road scene according to claim 12.

19. A method for detecting an element interfering with the visibility of a road scene illuminated by at least one light of a vehicle:
   capturing an image of the road scene;
   extracting at least one light halo from said image;
   deducing the presence or absence of the element using said at least one light halo;
   approximating a form of said at least one light halo using a curve;
   using said approximation to perform said deducing step.

20. A method for detecting an element interfering with the visibility of a road scene illuminated by at least one light of a vehicle:
   capturing an image of the road scene;
   extracting at least one light halo from said image; and
   deducing the presence or absence of the element using said at least one light halo;
   approximating a form of said at least one light halo;
   using said approximation to perform said deducing step,
   approximating said form of said at least one light halo by applying an elliptic curve that approximates a contour of said at least one light halo.

21. The method as recited in claim 19 wherein said extracting step comprises the step of:
   using a binarisation of said image to provide a binarised image;
   extracting said contour of said at least one light halo from said binarised image.

22. The method as recited in claim 20 wherein said approximating step further comprises the step of:
   determining a plurality of parameters of said elliptic curve.

23. The method as recited in claim 22 wherein said plurality of parameters comprises an estimation of a center of gravity.

24. The method as recited in claim 20 wherein said elliptic curve is obtained by combination of two ellipses.

* * * * *